US012681372B2

(12) United States Patent
Chang

(10) Patent No.: US 12,681,372 B2
(45) Date of Patent: Jul. 14, 2026

(54) LIGHT SOURCE MODULE AND PROJECTION DEVICE

(71) Applicant: Coretronic Corporation, Hsin-Chu (TW)

(72) Inventor: Jui Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 215 days.

(21) Appl. No.: 18/642,706

(22) Filed: Apr. 22, 2024

(65) Prior Publication Data

US 2024/0353746 A1      Oct. 24, 2024

(30) Foreign Application Priority Data

Apr. 24, 2023    (CN) .......................... 202310444121.4

(51) Int. Cl.
*G03B 21/20*              (2006.01)
(52) U.S. Cl.
CPC ..... *G03B 21/2013* (2013.01); *G03B 21/2033* (2013.01); *G03B 21/2066* (2013.01); *G03B 21/208* (2013.01)
(58) Field of Classification Search
CPC ............ G03B 21/2013; G03B 21/2033; G03B 21/2066; G03B 21/208; G03B 21/20; G02B 27/1006; G02B 27/143; G02B 19/0057
See application file for complete search history.

(56) References Cited

U.S. PATENT DOCUMENTS

2011/0234923 A1      9/2011  Yamagishi et al.
2012/0275149 A1*    11/2012  Huang ................. G02B 27/102
                                                            362/235
2015/0236479 A1*     8/2015  Seki ................... G02B 19/0028
                                                            359/733
2018/0063489 A1      3/2018  Aizaki et al.
(Continued)

FOREIGN PATENT DOCUMENTS

CN          102004384          4/2011
CN          207541400          6/2018
(Continued)

OTHER PUBLICATIONS

"Office Action of China Counterpart Application", issued on Aug. 13, 2025, p. 1-p. 6.
(Continued)

*Primary Examiner* — John R Schnurr
(74) *Attorney, Agent, or Firm* — JCIPRNET

(57)      ABSTRACT

A light source module including first and second laser arrays, first to six reflective elements, first and second light splitting elements, and an optical lens element is provided. The first laser array provides first light and second light. The second laser array provides third light and fourth light. The first light splitting element reflects the fourth light from the sixth reflective element and allows the first light from the first reflective element to pass through to the optical lens element. The second light splitting element reflects the second light from the fifth reflective element and allows the third light from the third reflective element to pass through to the optical lens element. Orthogonal projections of the first light splitting element and the second light splitting element on the optical lens element are partially overlapped.

21 Claims, 9 Drawing Sheets

(56) References Cited

U.S. PATENT DOCUMENTS

| | | | |
|---|---|---|---|
| 2019/0049833 A1 | 2/2019 | Maeda | |
| 2019/0310539 A1 | 10/2019 | Yamagishi et al. | |
| 2020/0201162 A1 | 6/2020 | Sudo | |
| 2020/0241404 A1 | 7/2020 | Chen | |
| 2021/0240064 A1* | 8/2021 | Chang | G03B 21/2013 |
| 2021/0243415 A1 | 8/2021 | Chen et al. | |
| 2021/0247679 A1 | 8/2021 | Chang | |
| 2021/0321066 A1 | 10/2021 | Yogo | |
| 2022/0004090 A1* | 1/2022 | Tian | G03B 21/2033 |
| 2022/0082918 A1 | 3/2022 | Weng | |
| 2023/0028602 A1* | 1/2023 | Li | G02B 3/0062 |
| 2023/0314921 A1* | 10/2023 | Yan | G03B 21/2033 353/122 |
| 2023/0333457 A1* | 10/2023 | Wang | G03B 21/2033 |
| 2024/0027884 A1* | 1/2024 | Chang | G03B 33/10 |
| 2024/0248290 A1* | 7/2024 | Chang | G02B 27/141 |
| 2024/0264515 A1* | 8/2024 | Yan | G03B 33/12 |
| 2025/0013139 A1* | 1/2025 | Li | G03B 21/20 |

FOREIGN PATENT DOCUMENTS

| | | |
|---|---|---|
| CN | 110275375 | 9/2019 |
| CN | 210136386 | 3/2020 |
| CN | 111812856 | 10/2020 |
| CN | 213302752 | 5/2021 |
| CN | 113253553 | 8/2021 |
| CN | 114200753 | 3/2022 |
| CN | 114815481 | 7/2022 |
| CN | 115308982 | 11/2022 |
| JP | 2021135333 | 9/2021 |
| WO | 2023030016 | 3/2023 |

OTHER PUBLICATIONS

"Search Report of Europe Counterpart Application", issued on Jun. 4, 2024, p. 1-p. 13.

"Search Report of Europe Counterpart Application", issued on Oct. 2, 2024, p. 1-p. 5.

"Office Action of U.S. Related Application, U.S. Appl. No. 18/415,683", issued on May 7, 2026, p. 1-p. 28.

* cited by examiner

50

LIGHT SOURCE MODULE AND PROJECTION DEVICE

CROSS-REFERENCE TO RELATED APPLICATION

This application claims the priority benefit of China application serial no. 202310444121.4 filed on Apr. 24, 2023. The entirety of the above-mentioned patent application is hereby incorporated by reference herein and made a part of this specification.

BACKGROUND

Technical Field

The disclosure relates to an optical module and an electronic device, and particularly relates to a light source module and a projection device.

Description of Related Art

Projection device is a display device for producing large-scale images, and has been continuously developed along with evolution and innovation of technology. An imaging principle of the projection device is to convert an illumination light generated by an illumination system into an image light through a light valve, and then project the image light to a projection target (such as a screen or a wall) through a projection lens to form a projection image. In addition, along with requirements of the market on brightness, color saturation, service life, non-toxic and environmental protection of the projection device, the illumination system has also evolved from ultra-high-performance lamps (UHP lamps), light-emitting diodes (LEDs) to today's most advanced laser diode (LD) light source, and even all-in-one laser diode package light source is developed.

In order to improve color uniformity and reduce an overall volume, in an optical path design of the system, blue light and green light are usually first combined before entering an optical engine system. However, in a current framework, thick glass optical elements are mostly used for combining light, and the cost of such optical elements is high. In addition, in order to match with red light, the blue-green light needs to be expanded after light combination, but this method will increase additional cost and volume.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a light source module and a projection device, which are adapted to uniformize a plurality of light spots formed by light beams on a light incident surface of an optical lens element, thereby improving color uniformity, and reducing volume and cost.

Additional aspects and advantages of the disclosure will be set forth in the description of the techniques disclosed in the disclosure.

In order to achieve one or a portion of or all of the objects or other objects, an embodiment of the disclosure provides a light source module including a first laser array, a second laser array, a first reflective element, a second reflective element, a third reflective element, a fourth reflective element, a fifth reflective element, a sixth reflective element, a first light splitting element, a second light splitting element and an optical lens element. Where, the first laser array provides a first light and a second light along a direction parallel to a first direction. The second laser array provides a third light and a fourth light along the direction parallel to the first direction. The first light is sequentially transmitted from the first laser array to the first reflective element, the first light splitting element and the optical lens element. The second light is sequentially transmitted from the first laser array to the second reflective element, the fifth reflective element, the second light splitting element and the optical lens element. The third light is sequentially transmitted from the second laser array to the third reflective element, the second light splitting element and the optical lens element. The fourth light is sequentially transmitted from the second laser array to the fourth reflective element, the sixth reflective element, the first light splitting element and the optical lens element. The first light splitting element is configured to reflect the fourth light from the sixth reflective element and allow the first light from the first reflective element to pass through to the optical lens element. The second light splitting element is configured to reflect the second light from the fifth reflective element and allow the third light from the third reflective element to pass through to the optical lens element. Wherein, orthogonal projections of the first light splitting element and the second light splitting element on the optical lens element are at least partially overlapped.

In order to achieve one or a portion of or all of the objects or other objects, an embodiment of the disclosure provides a projection device including an illumination system, at least one light valve and a projection lens. Where, the illumination system is configured to provide an illumination light. The light source module includes a first laser array, a second laser array, a first reflective element, a second reflective element, a third reflective element, a fourth reflective element, a fifth reflective element, a sixth reflective element, a first light splitting element, a second light splitting element and an optical lens element. Where, the first laser array provides a first light and a second light along a direction parallel to a first direction. The second laser array provides a third light and a fourth light along the direction parallel to the first direction. The first light is sequentially transmitted from the first laser array to the first reflective element, the first light splitting element and the optical lens element. The second light is sequentially transmitted from the first laser array to the second reflective element, the fifth reflective element, the second light splitting element and the optical lens element. The third light is sequentially transmitted from the second laser array to the third reflective element, the second light splitting element and the optical lens element. The fourth light is sequentially transmitted from the second laser array to the fourth reflective element, the sixth reflective element, the first light splitting element and the optical lens element. The first light splitting element is configured to reflect the fourth light from the sixth reflective element and allow the first light from the first reflective element to pass through to the optical lens element. The second light splitting element is configured to reflect the second light from the fifth reflective element and allow the third light from the third reflective element to pass through to the optical lens element. Wherein, orthogonal projections of the first light splitting element and the second light splitting element on the optical lens element are at least partially overlapped. The at least one light valve is disposed on a transmission path of the illumination light for converting the illumination light into an image light. The projection lens is disposed on a transmission path of the image light, and is configured to project the image light out of the projection device.

Based on the above description, the embodiments of the disclosure have at least one of the following advantages or effects. In the light source module and the projection device of the disclosure, the first laser array provides the first light and the second light along the direction parallel to the first direction, the second laser array provides the third light and the fourth light along the direction parallel to the first direction, and the first reflective element to the fourth reflective element are located between the first laser array and the second laser array to reflect the first light to the fourth light to the fifth reflective element, the sixth reflective element, the first light splitting element and the second light splitting element. In this way, the first light to the fourth light may be guided to the optical lens element by the first reflective element to the sixth reflective element, the first light splitting element and the second light splitting element, and the multiple light spots formed by the first light to the fourth light on a light incident surface of the optical lens element may be uniformized, thereby improving color uniformity, and saving the configuration of light combining elements and light expanders made of thick glass, so as to reduce volume and cost.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
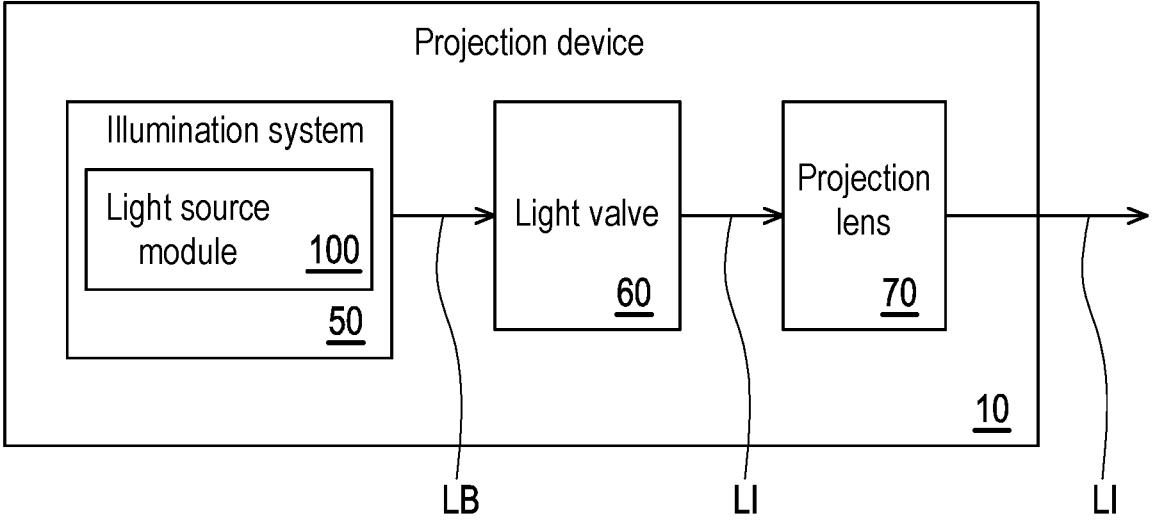
FIG. 1 is a schematic diagram of a projection device according to an embodiment of the disclosure.

FIG. 1 is a schematic diagram of a projection device according to an embodiment of the disclosure. Referring to FIG. 1, the embodiment provides a projection device 10 including an illumination system 50, at least one light valve 60 and a projection lens 70. Where, the illumination system 50 is configured to provide an illumination light LB. The at least one light valve 60 is disposed on a transmission path of the illumination light LB for converting the illumination light LB into an image light LI. The projection lens 70 is disposed on a transmission path of the image light LI, and is configured to project the image light LI out of the projection device 10 to a projection target (not shown), such as a screen or a wall.

The illumination system 50 is configured to provide the illumination light LB. For example, in the embodiment, the illumination system 50 is composed of a plurality of light-emitting elements, a reflective element 52, diffusion elements 54/58, a light uniformizing element 56 and/or a plurality of light guide elements, and is used for providing lights of different wavelengths for subsequently forming the image light LI. Where, the plurality of light-emitting elements are, for example, laser diodes (LDs); the diffusion element 54 is, for example, a diffuser wheel, and the diffusion element 58 is, for example, a static diffuser. In the embodiment, the diffusion element 54 and the diffusion element 58 may have different hazes to make color more uniform, but the disclosure is not limited thereto; the light uniformizing element 56 is, for example, an integrating rod, which may be made of reflective mirrors, and, for example, adopt multiple reflections to enhance laser light uniformity;

the light guide elements are, for example, dichroic mirrors or reflectors. However, the disclosure does not limit the type or form of the illumination system 50 and the various components it contains in the projection device 10, and its detailed structure and implementation method may be provided with sufficient guidance, suggestions, and implementation instructions based on subsequent explanations and common knowledge in the technical field.

The light valve 60 is, for example, a reflective light modulator such as a liquid crystal on silicon panel (LCoS panel) or a digital micro-mirror device (DMD). In some embodiments, the light valve 60 may also be a transmissive optical modulator such as a transparent liquid crystal panel, an electro-optical modulator, a magneto-optic modulator, an acousto-optic modulator (AOM), etc. The disclosure does not limit the form and type of the light valve 60. Detailed steps and implementation of the method of converting the illumination light LB into the image light LI by the light valve 60 may be provided with sufficient guidance, suggestions, and implementation instructions based on general knowledge in the related technical field, which will not be repeated. In the embodiment, the number of the light valve 60 is one, for example, the projection device 10 using a single digital micro-mirror device, but there may be multiple light valves in other embodiments, and the disclosure is not limited thereto.

The projection lens 70 includes, for example, a combination of one or more optical lens elements with refractive power, for example, various combinations of non-planar lenses such as biconcave lenses, biconvex lenses, concavo-convex lenses, convexo-concave lenses, plano-convex lenses, plano-concave lenses, etc. In an embodiment, the projection lens 70 may also include a planar optical lens element, which projects the image light LI from the light valve 60 onto the projection target in a reflective manner. The disclosure does not limit the form and type of the projection lens 70.

Figure 2:
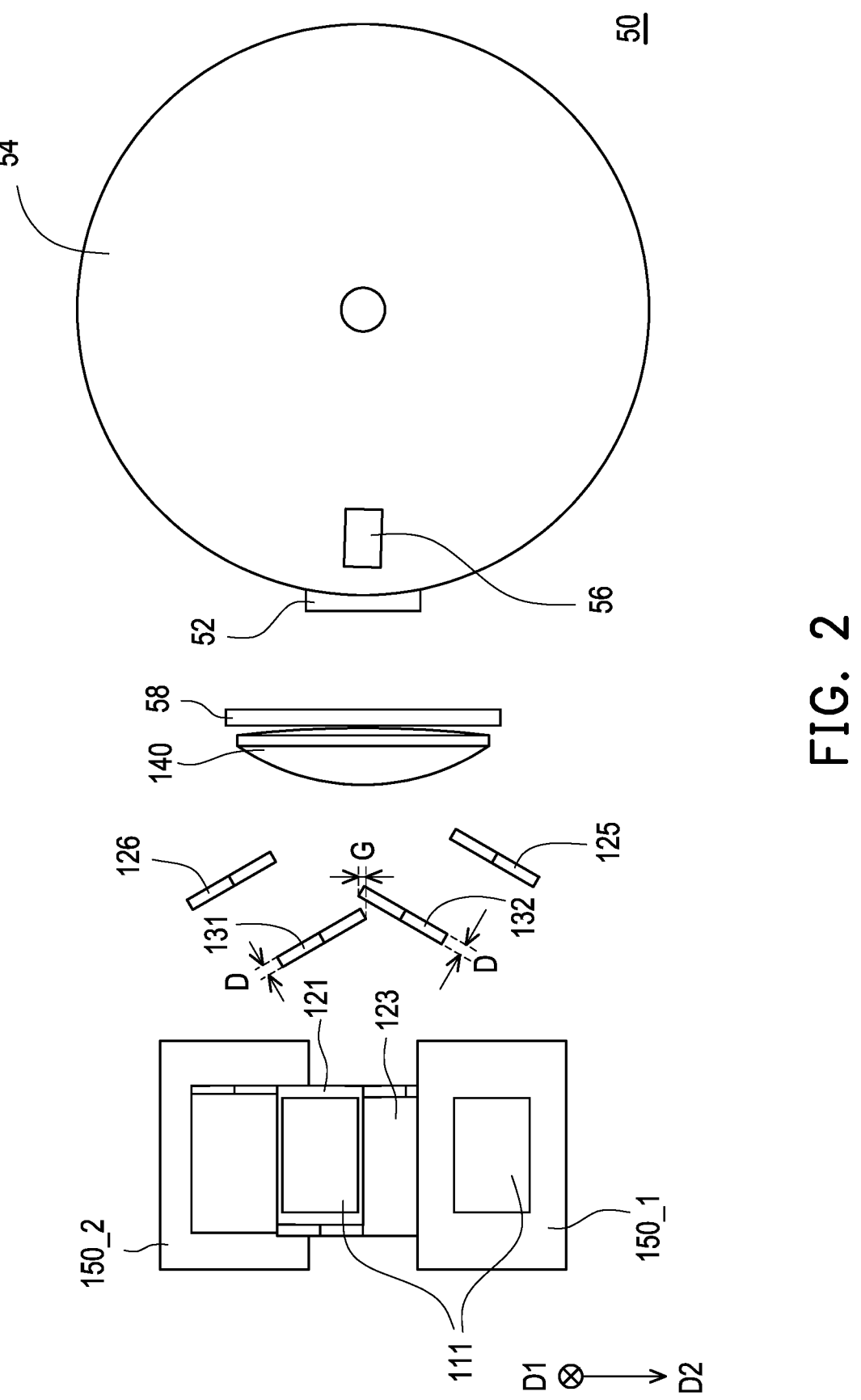
FIG. 2 and FIG. 3 are schematic views of different viewing angles of an illumination system according to an embodiment of the disclosure.
Figure 3:
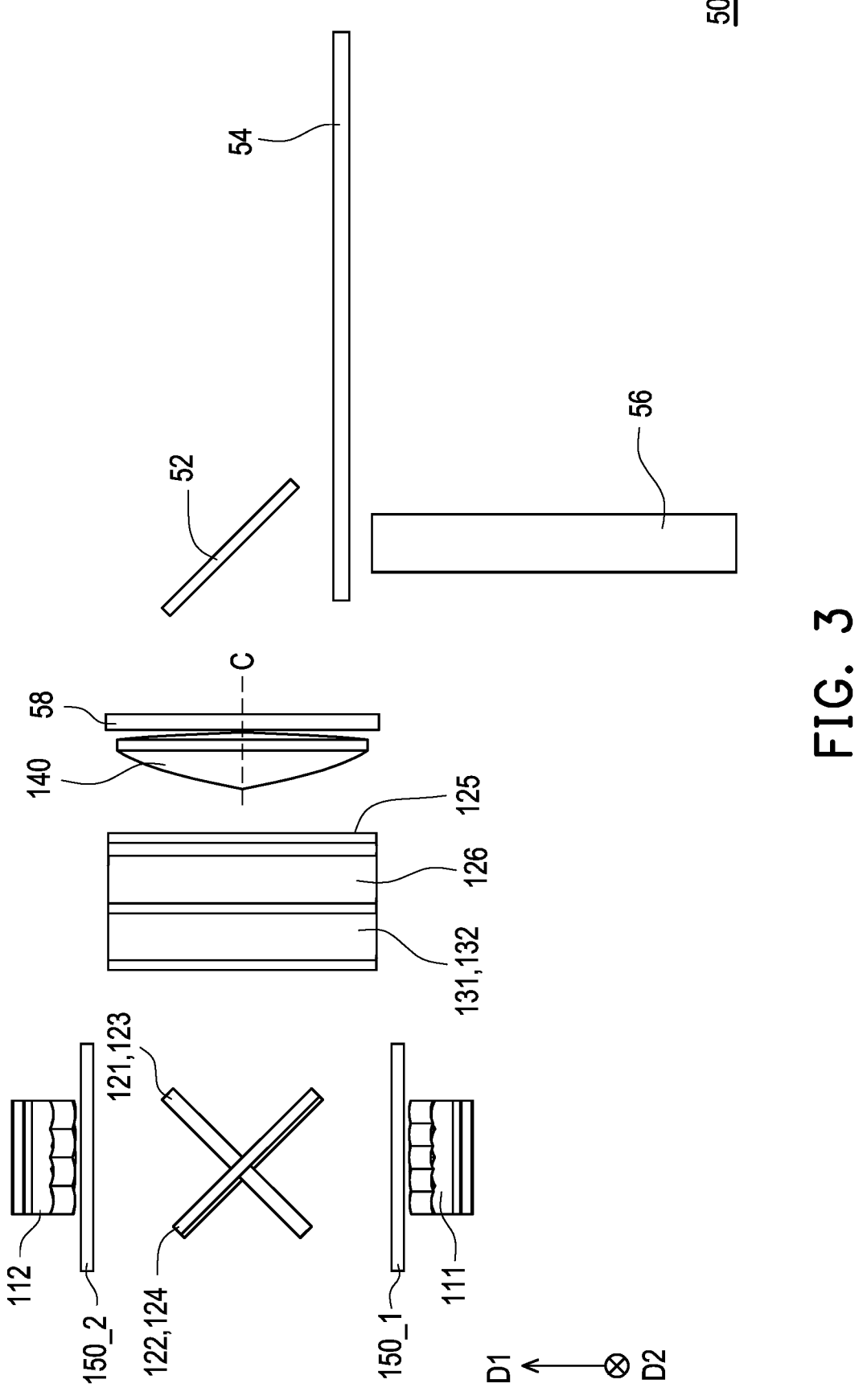
Figure 4:
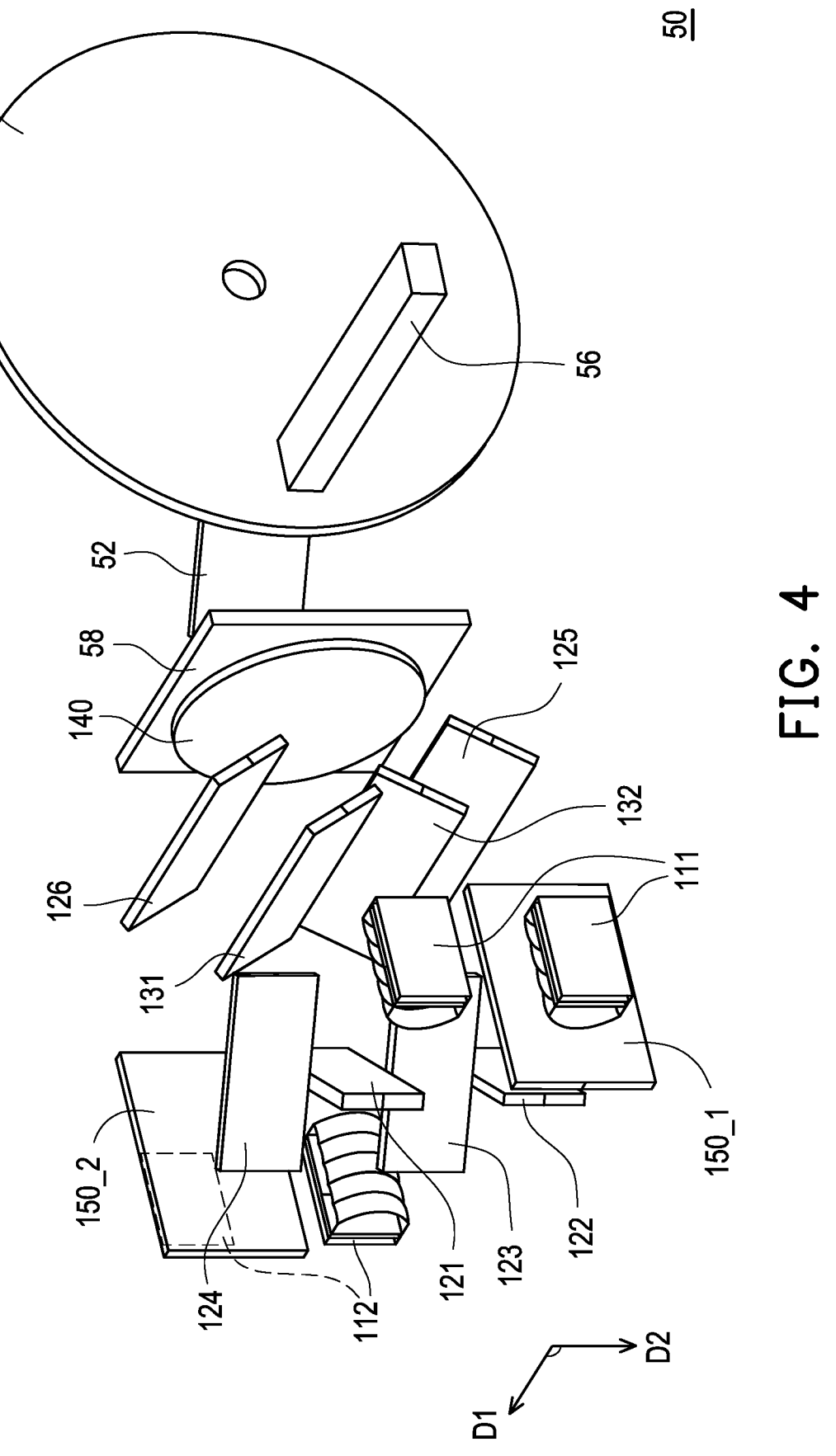
FIG. 4 is a schematic three-dimensional view of the illumination system of FIG. 2.

FIG. 2 and FIG. 3 are schematic views of different viewing angles of the illumination system according to an embodiment of the disclosure. FIG. 4 is a schematic three-dimensional view of the illumination system of FIG. 2. A light source module 100 shown in FIG. 2 to FIG. 4 may be at least applied to the projection device 10 shown in FIG. 1, and the following description is made based on the above example. Referring to FIG. 2 to FIG. 4, lights provided by a first laser array 111 and a second laser array 112 are omitted in FIG. 2 to FIG. 4 to make the image concise. The illumination system 50 includes the light source module 100, where the light source module 100 includes a first laser array 111, a second laser array 112, a first reflective element 121, a second reflective element 122, a third reflective element 123, a fourth reflective element 124, a fifth reflective element 125, a sixth reflective element 126, a first light splitting element 131, a second light splitting element 132 and an optical lens element 140. Where, the second laser array 112 and the first laser array 111 are respectively located on two opposite sides of a central axis C of the optical lens element 140. Specifically, the first reflective element 121, the second reflective element 122, the third reflective element 123 and the fourth reflective element 124 are located between the first laser array 111 and the second laser array 112, while the fifth reflective element 125, the six reflective elements 126, the first light splitting element 131 and the second light splitting element 132 are located between the first reflective element 121 to the fourth reflective element 124 and the optical lens element 140. In the embodiment, the first laser array 111 and the second laser array 112 are disposed in a direction parallel to a first direction D1, the first reflective element 121 to the fourth reflective element 124 are disposed in a direction parallel to a second direction D2, the orthographic projection of the first reflective element 121 overlaps the orthographic projection of the third reflective element 123 on a reference plane perpendicular to the second direction D2, the orthographic projection of the second reflective element 122 overlaps the orthographic projection of the fourth reflective element 124 on a reference plane perpendicular to the second direction D2, the orthographic projections of the first reflective element 121 to the fourth reflective element 124 on a reference plane perpendicular to the central axis C of the optical lens element 140 do not overlap with each other, and the fifth reflective element 125, the sixth reflective element 126, the first light splitting element 131 and the second light splitting element 132 are disposed in the direction parallel to the second direction D2, where the second direction D2 is perpendicular to the first direction D1.

In this embodiment, each of the first laser array 111 and the second laser array 112 has multiple red laser diodes, multiple blue laser diodes, and multiple green laser diodes. The multiple red laser diodes are configured to provide multiple red laser light beams. The multiple blue laser diodes are configured to provide multiple blue laser light beams. The multiple green laser diodes are configured to provide multiple green laser light beams.

Figure 5:
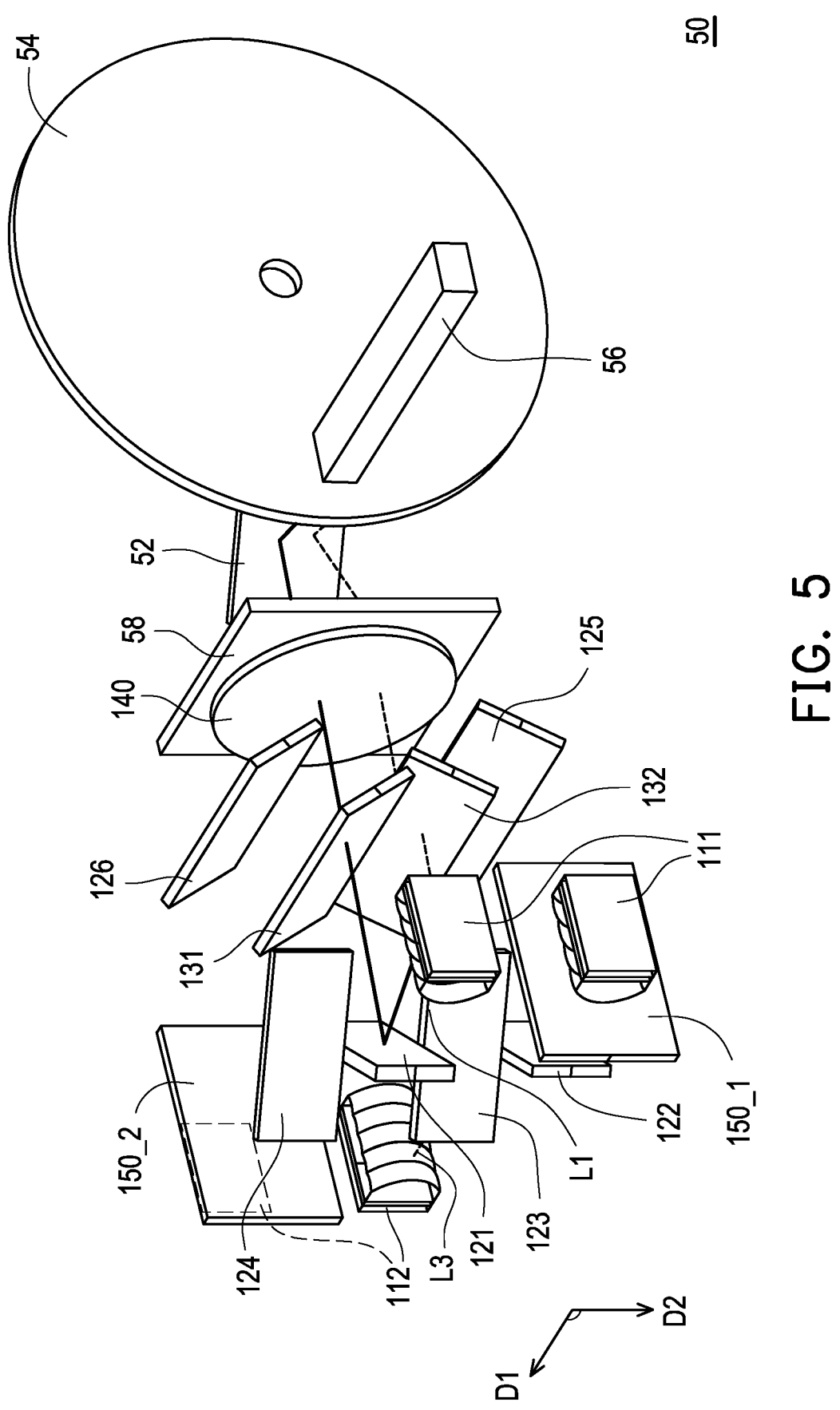
FIG. 5 is a schematic three-dimensional view of the illumination system of FIG. 4 when activating blue light.
Figure 6:
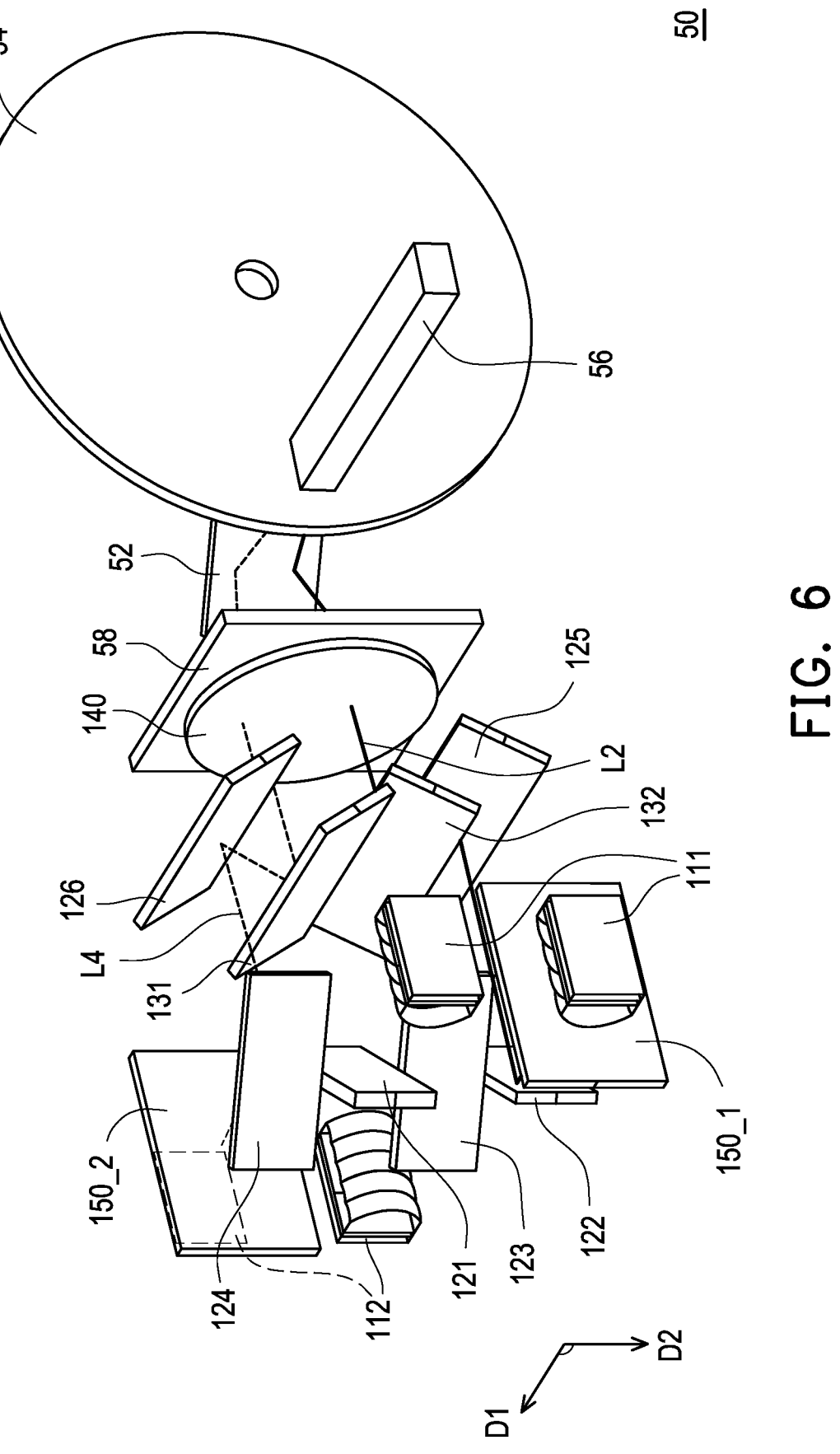
FIG. 6 is a schematic three-dimensional view of the illumination system of FIG. 4 when activating red light.

FIG. 5 is a schematic three-dimensional view of the illumination system of FIG. 4 when activating blue light. FIG. 6 is a schematic three-dimensional view of the illumination system of FIG. 4 when activating red light. Referring to FIG. 5 and FIG. 6 at the same time, in detail, the first laser array 111 provides a first light L1 and a second light L2 along the direction parallel to the first direction D1, and the second laser array 112 provides a third light L3 and a fourth light L4 along the direction parallel to the first direction D1. Each of the first light L1, the second light L2, the third light L3 and the fourth light L4 may be understood to include multiple laser light beams. In the embodiment, the first light L1 is, for example, green light or blue light, and the second light L2 is, for example, red light, but the first light L1 may also be, for example, red light, and the second light L2 may also be, for example, green light or blue light, which is not limited by the disclosure. The third light L3 is, for example, green light or blue light, and the fourth light L4 is, for example, red light, but the third light L3 may also be, for example, red light, and the fourth light L4 may also be, for example, green light or blue light, which is not limited by the disclosure. In the first laser array 111, a position of laser diodes used for providing the first light L1 and a position of laser diodes used for providing the second light L2 are different in the second direction D2, while in the second laser array 112, a position of laser diodes used for providing the third light L3 and a position of laser diodes used for providing the fourth light L4 are different in the second direction D2. In the first laser array 111, the orthographic projections of the laser diodes used to provide the first light L1 and the laser diodes used to provide the second light L2 on a reference plane perpendicular to the second direction D2 are overlapped from each other. In the second laser array 112, the orthographic projections of the laser diodes used to provide the third light L3 and the laser diodes used to provide the fourth light L4 on the reference plane are overlapped from each other. The orthographic projections of the laser diodes in the first laser array 111 used to provide the first light L1, the laser diodes in the first laser array 111 used to provide the second light L2, the laser diodes in the second laser array 112 used to provide the third light L3, and the laser diodes in the second laser array 112 used to provide the fourth light L4 on the reference plane perpendicular to the first direction D1 are staggered from each other. In the embodiment, a wavelength of the first light L1 is the same as a wavelength of the third light L3, and a wavelength of the second light L2 is the same as a wavelength of the fourth light L4. In other words, each of the first laser array 111 and the second laser array 112 packages multiple laser diodes, for example, the first laser array 110 and the second laser array 120 package the same laser diodes. In the embodiment, the first light splitting element 131 and the second light splitting element 132 respectively allow the first light L1 and the third light L3 to pass through, and reflect the second light L2 and the fourth light L4. Namely, the first light splitting element 131 and the second light splitting element 132 are, for example, dichroic mirrors with red reflect (DMR).

Figure 8A:
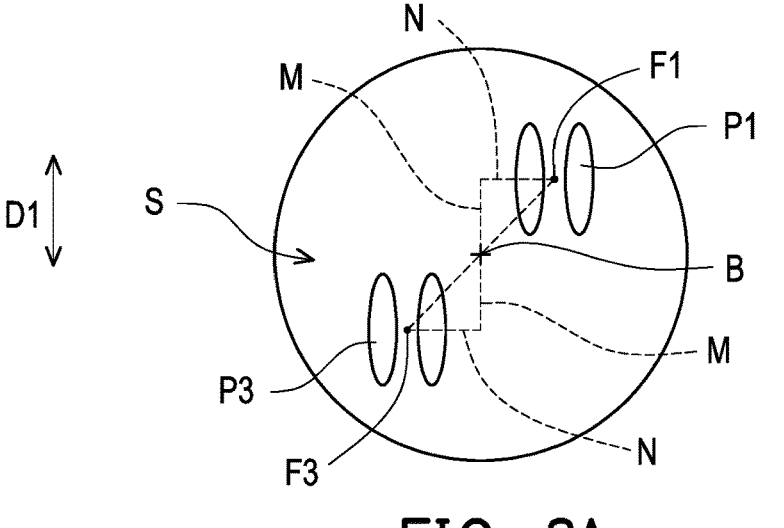
FIG. 8A to FIG. 8C are schematic diagrams of light spots formed by different light beams on a light incident surface of an optical lens element in a light source module of FIG. 2.

In an optical path structure, the first light L1 is sequentially transmitted from the first laser array 111 to the first reflective element 121, the first light splitting element 131 and the optical lens element 140. In other words, the first laser array 111 provides the first light L1 to the first reflective element 121, and the first reflective element 121 reflects the first light L1 from the first laser array 111 and transmits the same to the first light splitting element 131, and the first light splitting element 131 allows the first light L1 from the first reflective element 121 to pass through for transmitting to the optical lens element 140. Finally, the first light L1 forms a plurality of first light spots P1 on a light incident surface S of the optical lens element 140 (as shown in FIG. 8A).

Figure 8B:
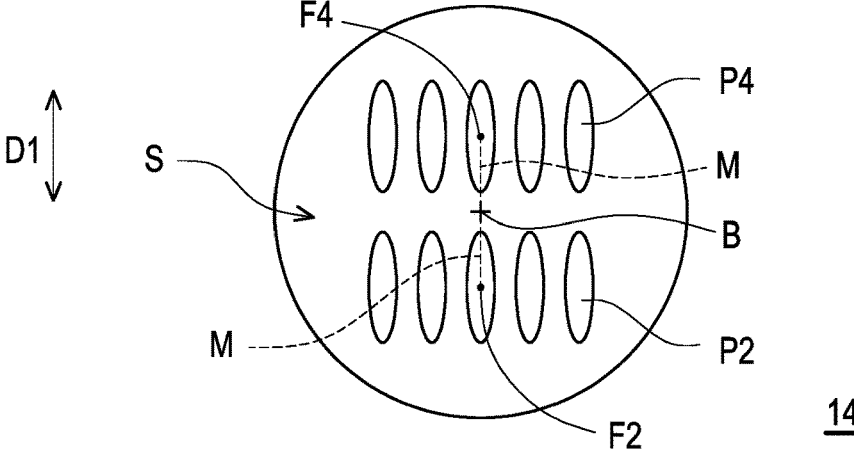

The second light L2 is sequentially transmitted from the first laser array 111 to the second reflective element 122, the fifth reflective element 125, the second light splitting element 132 and the optical lens element 140. In other words, the first laser array 111 provides the second light L2 to the second reflective element 122, the second reflective element 122 reflects the second light L2 from the first laser array 111 and transmits the same to the fifth reflective element 125, and the fifth reflective element 125 reflects the second light L2 from the second reflective element 122 and transmits the same to the second light splitting element 132, and the second light splitting element 132 reflects the second light L2 from the fifth reflective element 125 for transmitting to the optical lens element 140. Finally, the second light L2 forms a plurality of second light spots P2 on the light incident surface S of the optical lens element 140 (as shown in FIG. 8B).

The third light L3 is sequentially transmitted from the second laser array 112 to the third reflective element 123, the second light splitting element 132 and the optical lens element 140. In other words, the second laser array 112 provides the third light L3 to the third reflective element 123, the third reflective element 123 reflects the third light L3 from the second laser array 112 and transmits the same to the second light splitting element 132, and the second light splitting element 132 allows the third light L3 from the third reflective element 123 to pass through for transmitting to the optical lens element 140. Finally, the third light L3 forms a plurality of third light spots P3 on the light incident surface S of the optical lens element 140 (as shown in FIG. 8A).

The fourth light L4 is sequentially transmitted from the second laser array 112 to the fourth reflective element 124, the sixth reflective element 126, the first light splitting element 131 and the optical lens element 140. In other words, the second laser array 112 provides the fourth light L4 to the fourth reflective element 124, the fourth reflective element 124 reflects the fourth light L4 from the second laser array 112 and transmits the same to the sixth reflective element 126, the sixth reflective element 126 reflects the fourth light L4 from the fourth reflective element 124 and transmits the same to the first light splitting element 131, and the first light splitting element 131 reflects the fourth light L4 from the sixth reflective element 126 and transmits the same to the optical lens element 140. Finally, the fourth light L4 forms a plurality of fourth light spots P4 on the light incident surface S of the optical lens element 140 (as shown in FIG. 8B).

It should be noted that orthogonal projections of the first light splitting element 131 and the second light splitting element 132 on the optical lens element 140 are at least partially overlapped. That is, the orthographic projection of the first light splitting element 131 partially overlaps the orthographic projection of the second light splitting element 132 on a reference plane perpendicular to the central axis C of the optical lens element 140, and the two orthographic projections have an overlap length on the second direction D2. For example, in the embodiment, by configuring a distance between the second light splitting element 132 and the optical lens element 140 to be smaller than a distance between the first light splitting element 131 and the optical lens element 140, the two orthographic projections of the first light splitting element 131 and the second light splitting element 132 on a reference plane perpendicular to the central axis C of the optical lens element 140 may partially overlap, and the two orthographic projections have an overlapping length in the second direction D2. In addition, the orthographic projections of the fifth reflective element 125 and the sixth reflective element 126 on a reference plane perpendicular to the central axis C of the optical lens element 140 do not overlap with each other. In this way, the first light L1 to the fourth light L4 may be guided to the optical lens element 140 by the first reflective element 121 to the sixth reflective element 126, the first light splitting element 131 and the second light splitting element 132, and the multiple light spots formed by the first light L1 to the fourth light L4 on the light incident surface S of the optical lens element 140 may be uniformized, thereby improving the color uniformity, and saving the configuration of light combining elements and light expanders made of thick glass, so as to reduce volume and cost.

Figure 7:
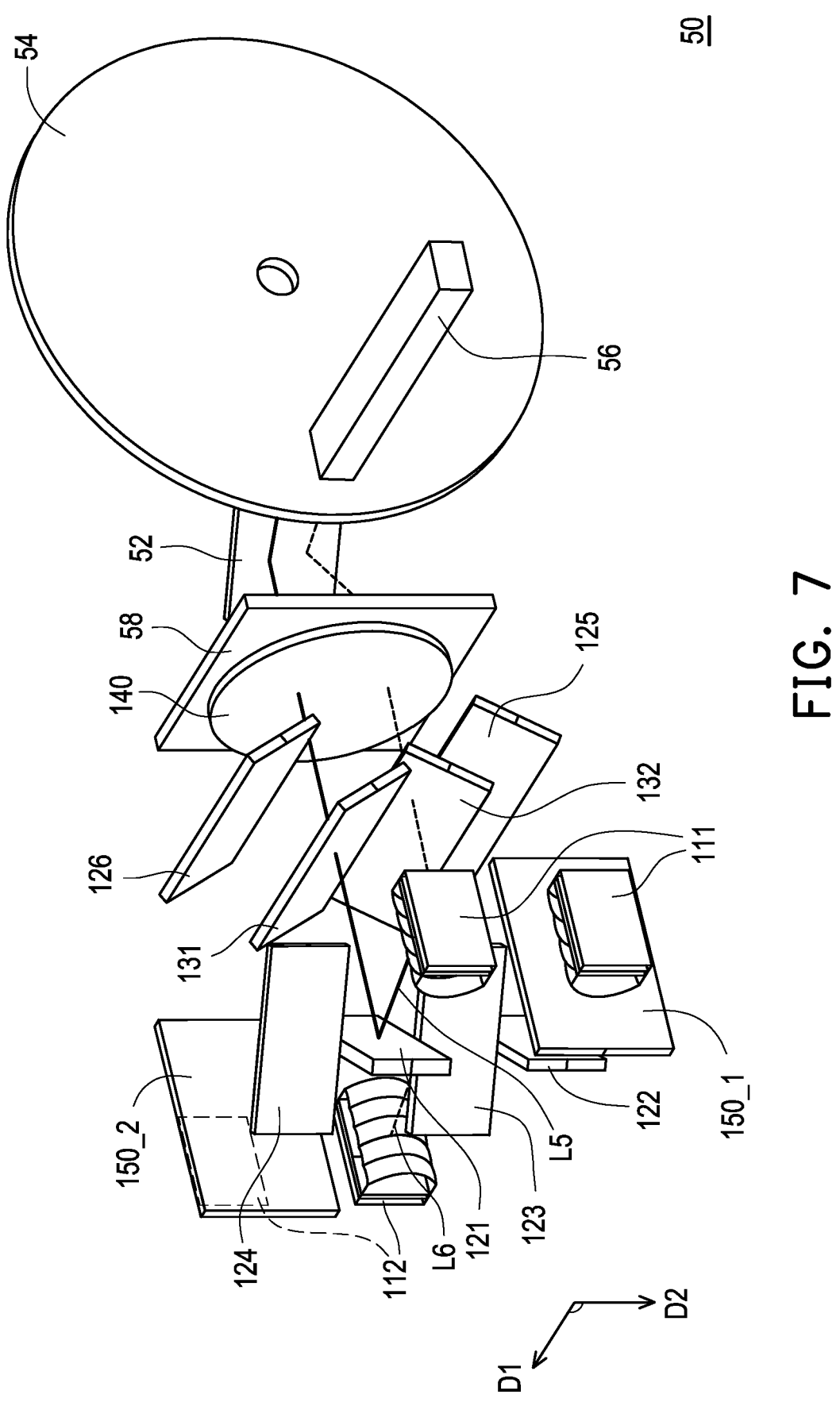
FIG. 7 is a schematic three-dimensional view of the illumination system in FIG. 4 when activating green light.

FIG. 7 is a schematic three-dimensional view of the illumination system in FIG. 4 when activating green light. In the embodiment, the first laser array 111 may also provide a fifth light L5 along the direction parallel to the first direction D1 , and the second laser array 112 may also provide a sixth light L6 along the direction parallel to the first direction D1. One of the first reflective element 121 and the second reflective element 122 reflects the fifth light L5 from the first laser array 111, and one of the third reflective element 123 and the fourth reflective element 124 reflects the six light L6 from the second laser array 112. A wavelength of the fifth light L5 is the same as a wavelength of the sixth light L6. For example, in the embodiment, the first light L1 provided by the first laser array 111 is blue light, the second light L2 is red light, and the fifth light L5 is green light. The third light L3 provided by the second laser array 112 is blue light, the fourth light L4 is red light, and the sixth light L6 is green light. Each of the fifth light L5 and the sixth light L6 may also be understood to include multiple laser light beams.

Therefore, according to intensity characteristics of the red, blue, and green laser lights, the blue laser diodes and green laser diodes are disposed in one row of the first laser array 111 and the second laser array 112, and the red laser diodes are disposed in another row of the first laser array 111 and the second laser array 112 to balance the light intensity of the red, blue, and green lights. Therefore, the first reflective element 121 is disposed on a transmission path of the first light L1 and the fifth light L5, the second reflective element 122 is disposed on a transmission path of the second light L2, the third reflective element 123 is disposed on a transmission path of the third light L3 and the sixth light L6, and the fourth reflective element 124 is disposed on a transmission path of the fourth light L4. In the embodiment, the first laser array 111 and the second laser array 112 respectively have four red laser diodes, three green laser diodes and two blue laser diodes, but the disclosure is not limited thereto. That is, the number of the red laser diodes, blue laser diodes and green laser diodes can be greater, for example, the number of red laser diodes is five. In addition, in the embodiment, the light source module 100 further includes two polarizing elements 150_1 and 150_2 respectively disposed on the transmission paths of the lights provided by the first laser array 111 and the second laser array 112. For example, the polarizing element 150_1 is disposed on the transmission path of the red light in the first laser array 111, and the polarizing element 150_2 is disposed on the transmission path of the red light in the second laser array 112 for adjusting polarization states of the red lights provided by the first laser array 111 and the second laser array 112. In another embodiment, the polarizing element 150_1 may also be disposed on the transmission path of the blue light and green light in the first laser array 111, and the polarizing element 150_2 is disposed on the transmission path of the blue light and green light in the second laser array 112, which are not limited by the disclosure.

Figure 8C:
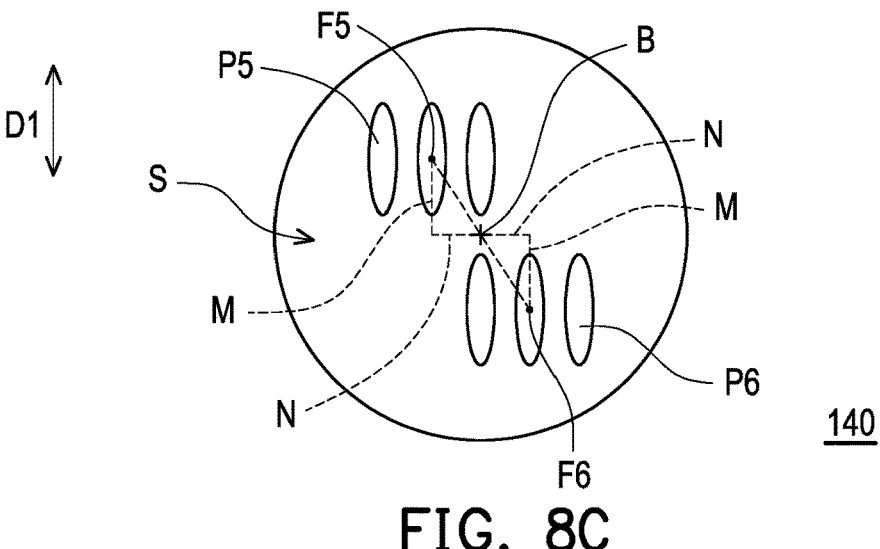

FIG. 8A to FIG. 8C are schematic diagrams of light spots formed by different light beams on the light incident surface of the optical lens element in the light source module of FIG. 2. Referring to FIG. 2 and FIG. 8A to 8C at the same time. As shown in FIG. 8A, the first light L1 of the blue light is transmitted to the light incident surface S of the optical lens element 140 to form a plurality of first light spots P1. The third light L3 of the blue light is transmitted to the the light incident surface S of the optical lens element 140 to form a plurality of third light spots P3, as shown in FIG. 8A. The plurality of first light spots P1 and the plurality of third light spots P3 are diagonally symmetrical with respect to a lens center point B of the optical lens element 140. As shown in FIG. 8B, the second light L2 of the red light is transmitted to the light incident surface S of the optical lens element 140 to form a plurality of second light spots P2. The fourth light L4 of the red light is transmitted to the light incident surface S of the optical lens element 140 to form a plurality of fourth light spots P4, as shown in FIG. 8B. The plurality of second light spots P2 and the plurality of fourth light spots P4 are arranged in an array with respect to the lens center point B of the optical lens element 140. As shown in FIG. 8C, the fifth light L5 of the green light is transmitted to the light incident surface S of the optical lens element 140 to form a plurality of fifth light spots P5. The sixth light L6 of the green light is transmitted to the light incident surface S of the optical lens element 140 to form a plurality of sixth light spots P6, as shown in FIG. 8C. The plurality of fifth light spots P5 and the plurality of sixth light spots P6 are diagonally symmetrical with respect to the lens center point B of the optical lens element 140. The presentation of the above multiple light spots (multiple first light spots P1, multiple second light spots P2, multiple third light spots P3, multiple fourth light spots P4, multiple fifth light spots P5 and multiple sixth light spots P6) in FIG. 8A, FIG. 8B and FIG. 8C is an example, but the disclosure is not limited thereto.

For the diagonally symmetrical light spots, in a preferred embodiment, the light source module 100 complies with a conditional expression: 1.0<(b/a)<4.0, where b is a distance M from spot center points F1, F3, F5, and F6 of the plurality of light spots (FIG. 8A or FIG. 8C) formed by the lights (the first light L1 and the third light L3 of the blue light, the fifth light L5 and the sixth light L6 of the green light) on the optical lens element 140 to the lens center point B of the optical lens element 140 in the first direction D1, and a is a distance N from the spot center points of the plurality of light spots formed by the lights on the optical lens element 140 to the lens center point B of the optical lens element 140 in a direction perpendicular to the first direction D1 . In this way, the light source module 100 may have better luminous efficiency, and the plurality of light spots formed by the blue-green lights on the optical lens element 140 may be symmetrical.

In addition, in a preferred embodiment, the light source module 100 complies with a conditional expression: c−d<e<c+d, where c is a thickness D of the first light splitting element 131 and the second light splitting element 132 (as shown in FIG. 2) divided by a square root of 2, d is 0.1 times the thickness D of the first light splitting element 131 and the second light splitting element 132, and e is a length G (as shown in FIG. 2) of the overlapping portion of the orthogonal projections formed by the first light splitting element 131 and the second light splitting element 132 on the light incident surface S of the optical lens element 140 in the direction perpendicular to the first direction D1 . In this way, the distances from the spot center points F1, F2, F3, F4, F5, and F6 of the plurality of light spots to the lens center B of the optical lens element 140 may be further reduced, i.e., the light spots may be concentrated.

Figure 9:
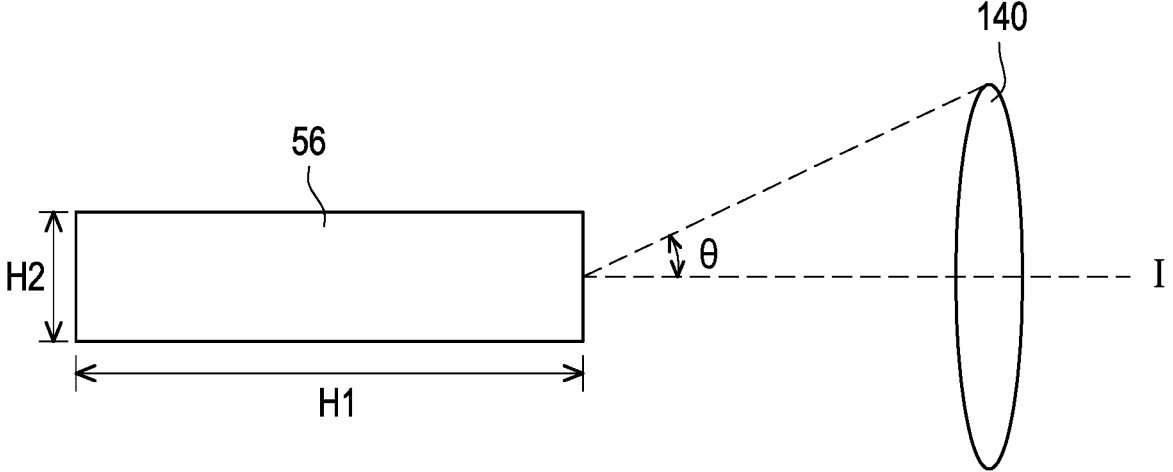
FIG. 9 is a schematic diagram of an optical lens element and a light uniformizing element in an illumination system according to an embodiment of the disclosure.

FIG. 9 is a schematic diagram of an optical lens element and a light uniformizing element in an illumination system according to an embodiment of the disclosure. Referring to FIG. 2 and FIG. 9 at the same time, in addition, a light uniformizing element 56 of the illumination system 50 is disposed on a transmission path of the lights (i.e., the first light L1 to the sixth light L6) from the optical lens element 140, and a light receiving surface of the light uniformizing element 56 is a rectangle with long sides and short sides. In a preferred embodiment, the light source module 100 complies with a conditional expression: 1.4≤f*tan (θ)/h≤3.7, where f is a length H1 of the light uniformizing element 56 in the direction of an optical axis I, θ is an included angle between the maximum length from the optical lens element 140 to the light uniformizing element 56 and the minimum length from the optical lens element 140 to the light uniformizing element 56, and h is a length H2 of the long side of the light uniformizing element 56 in the direction perpendicular to the optical axis I. In this way, the luminous efficiency and uniformity of the illumination system 50 may be further improved, and the design of ≤3.7 results in a better space utilization rate of the light uniformizing element 56.

In summary, the embodiments of the disclosure have at least one of the following advantages or effects. In the light source module and the projection device of the disclosure, the first laser array provides the first light and the second light along the direction parallel to the first direction, the second laser array provides the third light and the fourth light along the direction parallel to the first direction, and the first reflective element to the fourth reflective element are located between the first laser array and the second laser array to reflect the first light to the fourth light to the fifth reflective element, the sixth reflective element, the first light splitting element and the second light splitting element. In this way, the first light to the fourth light may be guided to the optical lens element by the first reflective element to the sixth reflective element, the first light splitting element and the second light splitting element, and the multiple light spots formed by the first light to the fourth light on the light incident surface of the optical lens element may be uniformized, thereby improving color uniformity, and saving the configuration of light combining elements and light expanders made of thick glass, so as to reduce volume and cost. In addition, "first direction" and "second direction" described in all the embodiments of the present disclosure refer to D1 and D2 as shown in the figure, that is, "first direction" is the direction in which the "D1 " line extends, "second direction" is the direction in which the "D2" line extends.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure" does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A light source module, comprising a first laser array, a second laser array, a first reflective element, a second reflective element, a third reflective element, a fourth reflective element, a fifth reflective element, a sixth reflective element, a first light splitting element, a second light splitting element and an optical lens element, wherein:

the first laser array provides a first light and a second light along a direction parallel to a first direction;

the second laser array provides a third light and a fourth light along the direction parallel to the first direction;

12 the first light is sequentially transmitted from the first laser array to the first reflective element, the first light splitting element and the optical lens element;

the second light is sequentially transmitted from the first laser array to the second reflective element, the fifth reflective element, the second light splitting element and the optical lens element;

the third light is sequentially transmitted from the second laser array to the third reflective element, the second light splitting element and the optical lens element;

the fourth light is sequentially transmitted from the second laser array to the fourth reflective element, the sixth reflective element, the first light splitting element and the optical lens element;

the first light splitting element is configured to reflect the fourth light from the sixth reflective element and allow the first light from the first reflective element to pass through to the optical lens element; and the second light splitting element is configured to reflect the second light from the fifth reflective element and allow the third light from the third reflective element to pass through to the optical lens element;

wherein orthogonal projections of the first light splitting element and the second light splitting element on the optical lens element are at least partially overlapped.

2. The light source module as claimed in claim 1, wherein the first laser array and the second laser array are arranged in the direction parallel to the first direction, the first reflective element to the fourth reflective element are arranged in a direction parallel to a second direction, the fifth reflective element, the sixth reflective element, the first light splitting element, and the second light splitting element are arranged in the direction parallel to the second direction, and the second direction is perpendicular to the first direction.

3. The light source module as claimed in claim 1, wherein the first reflective element to the fourth reflective element are located between the first laser array and the second laser array.

4. The light source module as claimed in claim 1, wherein the fifth reflective element, the sixth reflective element, the first light splitting element and the second light splitting element are located between the first reflective element to the fourth reflective element and the optical lens element.

5. The light source module as claimed in claim 1, wherein the second laser array and the first laser array are respectively located on two opposite sides of a central axis of the optical lens element.

6. The light source module as claimed in claim 1, wherein a wavelength of the first light is the same as a wavelength of the third light, and a wavelength of the second light is the same as a wavelength of the fourth light.

7. The light source module as claimed in claim 1, wherein a plurality of first light spots formed by the first light on a light incident surface of the optical lens element and a plurality of third light spots formed by the third light on the light incident surface of the optical lens element are diagonally symmetrical or arranged in an array with respect to a lens center point of the optical lens element, and a plurality of second light spots formed by the second light on the light incident surface of the optical lens element and a plurality of fourth light spots formed by the fourth light on the light incident surface of the optical lens element are diagonally symmetrical or arranged in an array with respect to the lens center point of the optical lens element, and the lens center point is located on the central axis of the optical lens element.

8. The light source module as claimed in claim 1, wherein the first laser array further provides a fifth light along the direction parallel to the first direction, and the second laser array further provides a sixth light along the direction parallel to the first direction, one of the first reflective element and the second reflective element reflects the fifth light from the first laser array, and one of the third reflective element and the fourth reflective element reflects the sixth light from the second laser array, and a wavelength of the fifth light is the same as a wavelength of the sixth light.

9. The light source module as claimed in claim 1, wherein the light source module complies with a conditional expression: 1.0<(b/a)<4.0, wherein 'b' is a distance from a spot center point of a plurality of light spots formed by the first light or the third light on the optical lens element to a lens center point of the optical lens element in a direction perpendicular to the first direction, and 'a' is a distance from the spot center point of the plurality of light spots formed by the first light or the third light on the optical lens element to the lens center point of the optical lens element in the first direction.

10. The light source module as claimed in claim 1, wherein the light source module complies with a conditional expression: c−d<e<c+d, wherein 'c' is a thickness of the first light splitting element and the second light splitting element divided by a square root of 2, 'd' is 0.1 times the thickness of the first light splitting element and the second light splitting element, and 'e' is a length of an overlapping portion of orthogonal projections formed by the first light splitting element and the second light splitting element on a light incident surface of the optical lens element in a direction perpendicular to the first direction.

11. A projection device, comprising an illumination system, at least one light valve and a projection lens, wherein:
the illumination system is configured to provide an illumination light, the illumination system comprises a light source module, and the light source module comprises a first laser array, a second laser array, a first reflective element, a second reflective element, a third reflective element, a fourth reflective element, a fifth reflective element, a sixth reflective element, a first light splitting element, a second light splitting element and an optical lens element, wherein
the first laser array provides a first light and a second light along a direction parallel to a first direction;
the second laser array provides a third light and a fourth light along the direction parallel to the first direction;
the first light is sequentially transmitted from the first laser array to the first reflective element, the first light splitting element and the optical lens element;
the second light is sequentially transmitted from the first laser array to the second reflective element, the fifth reflective element, the second light splitting element and the optical lens element;
the third light is sequentially transmitted from the second laser array to the third reflective element, the second light splitting element and the optical lens element;
the fourth light is sequentially transmitted from the second laser array to the fourth reflective element, the sixth reflective element, the first light splitting element and the optical lens element;
the first light splitting element is configured to reflect the fourth light from the sixth reflective element and allow the first light from the first reflective element to pass through to the optical lens element; and the second light splitting element is configured to reflect the second light from the fifth reflective element and allow the third light from the third reflective element to pass through to the optical lens element, wherein orthogonal projections of the first light splitting element and the second light splitting element on the optical lens element are partially overlapped;
the at least one light valve is disposed on a transmission path of the illumination light for converting the illumination light into an image light; and
the projection lens is disposed on a transmission path of the image light, and is configured to project the image light out of the projection device.

12. The projection device as claimed in claim 11, wherein the first laser array and the second laser array are arranged in the direction parallel to the first direction, the first reflective element to the fourth reflective element are arranged in a direction parallel to a second direction, the fifth reflective element, the sixth reflective element, the first light splitting element, and the second light splitting element are arranged in the direction parallel to the second direction, and the second direction is perpendicular to the first direction.

13. The projection device as claimed in claim 11, wherein the first reflective element to the fourth reflective element are located between the first laser array and the second laser array.

14. The projection device as claimed in claim 11, wherein the fifth reflective element, the sixth reflective element, the first light splitting element and the second light splitting element are located between the first reflective element to the fourth reflective element and the optical lens element.

15. The projection device as claimed in claim 11, wherein the second laser array and the first laser array are respectively located on two opposite sides of a central axis of the optical lens element.

16. The projection device as claimed in claim 11, wherein a wavelength of the first light is the same as a wavelength of the third light, and a wavelength of the second light is the same as a wavelength of the fourth light.

17. The projection device as claimed in claim 11, wherein a plurality of first light spots formed by the first light on a light incident surface of the optical lens element and a plurality of third light spots formed by the third light on the light incident surface of the optical lens element are diagonally symmetrical or arranged in an array with respect to a lens center point of the optical lens element, and a plurality of second light spots formed by the second light on the light incident surface of the optical lens element and a plurality of fourth light spots formed by the fourth light on the light incident surface of the optical lens element are diagonally symmetrical or arranged in an array with respect to the lens center point of the optical lens element, and the lens center point is located on the central axis of the optical lens element.

18. The projection device as claimed in claim 11, wherein the first laser array further provides a fifth light along the direction parallel to the first direction, and the second laser array further provides a sixth light along the direction parallel to the first direction, one of the first reflective element and the second reflective element reflects the fifth light from the first laser array, and one of the third reflective element and the fourth reflective element reflects the sixth light from the second laser array, and a wavelength of the fifth light is the same as a wavelength of the sixth light.

19. The projection device as claimed in claim 11, wherein the light source module complies with a conditional expression: 1.0<(b/a)<4.0, wherein 'b' is a distance from a spot center point of a plurality of light spots formed by the first light or the third light on the optical lens element to a lens center point of the optical lens element in a direction perpendicular to the first direction, and 'a' is a distance from the spot center point of the plurality of light spots formed by the first light or the third light on the optical lens element to the lens center point of the optical lens element in the first direction.

20. The projection device as claimed in claim 11, wherein the light source module complies with a conditional expression: c−d<e<c+d, wherein 'c' is a thickness of the first light splitting element and the second light splitting element divided by a square root of 2, 'd' is 0.1 times the thickness of the first light splitting element and the second light splitting element, and 'e' is a length of an overlapping portion of orthogonal projections formed by the first light splitting element and the second light splitting element on a light incident surface of the optical lens element in a direction perpendicular to the first direction.

21. The projection device as claimed in claim 11, wherein the illumination system further comprises a light uniformizing element disposed on a transmission path of the first light to the fourth light from the optical lens element, the light source module complies with a conditional expression: $1.4 \leq f*\tan(\theta)/h \leq 3.7$, wherein f is a length of the light uniformizing element in a direction of an optical axis, $\theta$ is an included angle between the maximum length from the optical lens element to the light uniformizing element and the minimum length from the optical lens element to the light uniformizing element, and h is a length of a long side of the light uniformizing element in a direction perpendicular to the optical axis.

\* \* \* \* \*